United States Patent
Hutton et al.

(10) Patent No.: US 6,772,090 B2
(45) Date of Patent: Aug. 3, 2004

(54) APPARATUS FOR SECURE STORAGE OF VEHICLE ODOMETER VALUES AND METHOD THEREFOR

(75) Inventors: Brendon Hutton, Erding (DE); Fanie Duvenhage, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 337 days.

(21) Appl. No.: 09/769,679

(22) Filed: Jan. 25, 2001

(65) Prior Publication Data

US 2002/0099517 A1 Jul. 25, 2002

(51) Int. Cl.$^7$ ............................................. G01C 22/00
(52) U.S. Cl. ........................... 702/165; 377/24; 701/19; 701/33; 713/189; 713/194
(58) Field of Search .................... 702/165; 377/24, 377/26, 24.1; 701/19, 33; 713/189, 193, 194, 161; 380/280, 26, 57

(56) References Cited

U.S. PATENT DOCUMENTS

| | | | | |
|---|---|---|---|---|
| 4,559,637 A | * | 12/1985 | Weber | ........................ 377/24.1 |
| 5,297,178 A | * | 3/1994 | Martin | ........................ 377/26 |
| 5,386,533 A | * | 1/1995 | Morris | ........................ 711/103 |
| 5,412,730 A | * | 5/1995 | Jones | ........................ 380/46 |
| 5,924,057 A | * | 7/1999 | Kell | ........................ 702/165 |
| 6,092,193 A | * | 7/2000 | Loomis et al. | ........................ 713/193 |

* cited by examiner

Primary Examiner—John Barlow
Assistant Examiner—Hien Vo
(74) Attorney, Agent, or Firm—Baker Botts L.L.P.

(57) ABSTRACT

An improved vehicle odometer is provided with an encoder and a microcontroller. The encoder has a unique key that configures an encryption algorithm. The encryption algorithm can be in the form of circuitry or software or any combination there between. The encoder receives a increment signal from the vehicle indicating that the vehicle has traveled a pre-determined distance. The encoder then increments the odometer-related value and then encrypts it with the encryption algorithm. The encoder then wraps the encrypted odometer-related value into a data packet with a serial number. Only a suitably equipped computing device, such as a microcontroller, identify and correctly decrypt and process the encrypted odometer-related value, thereby preventing the tampering of the vehicle's odometer.

11 Claims, 9 Drawing Sheets

APPARATUS FOR SECURE STORAGE OF VEHICLE ODOMETER VALUES AND METHOD THEREFOR

BACKGROUND OF THE INVENTION

1. Field of the Invention

The present invention is related to secure storage of digital information. More specifically, the present invention is related to encryption and the encoding and decoding of digital information of, for example, an odometer.

2. Description of the Related Technology

With the advent of electronic odometers in vehicles, odometer fraud has become easier for educated criminals. Electric odometers store the odometer value in non-volatile memory, usually an EEPROM or similar device in order to ensure that the odometer value is preserved when the vehicle is switched off. The problem with the EEPROM is that it has a standard protocol interface that allows easy reading and writing to the EEPROM for someone educated in the electrical arts.

Figure 1:
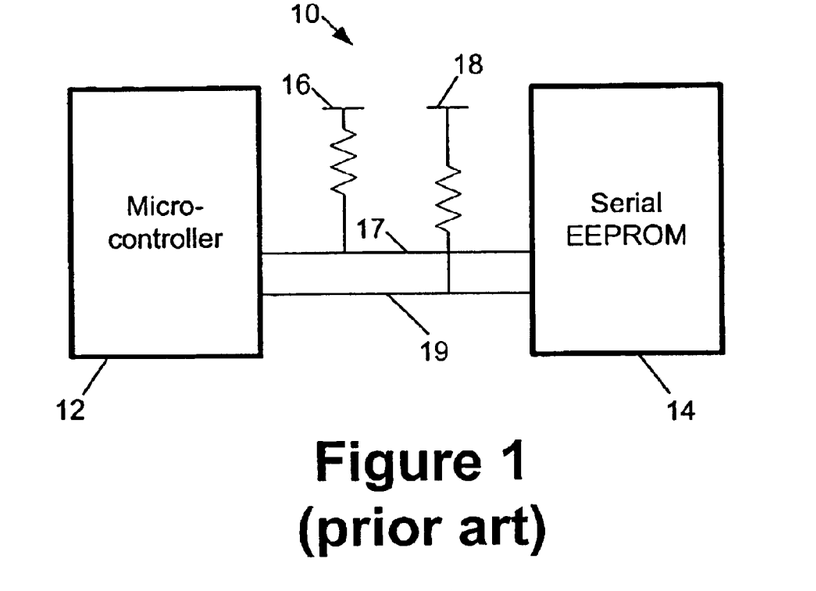
FIG. 1 is a block diagram of a prior art electronic odometer.

A typical prior art electric odometer is illustrated in FIG. 1. The odometer 10 is composed of a microcontroller 12 that is used for processing the value for a display device (not shown). The serial EEPROM 14 is used to store the odometer value which can be written to the EEPROM or read from the EEPROM by the microprocessor 12 via signal lines 17 and 19, respectively. As shown in FIG. 1, however, these signals could also be written/read via contacts 16 and 18, respectively.

There have been prior attempts to remedy the problems presented by electronic odometers. For example U.S. Pat. No. 5,924,057 disclosed a method of preventing odometer fraud employing a multiplex ring and a plurality of vehicle control modules. The odometer value was stored in the cluster control module and, periodically, in another module. If the main odometer value was tampered with, it would quickly be detected upon comparison with the value stored in an alternate module.

U.S. Pat. No. 5,297,178 discloses a tamper resistant system having a programmable memory counter with a plurality of memory locations arranged sequentially. Each of the memory locations includes a predetermined number of storage elements. Each storage element is programmable from a first value to a second value but not visa-versa. As these storage elements comprise the counter, the odometer reading of a vehicle cannot be reduced. Neither of these solutions, however, completely protects the odometer value, which is still subject to tampering, albeit with greater difficulty.

There is, therefore, a need in the art for a vehicle odometer that cannot be altered after initial setting. It is an object of the present invention to overcome the limitations inherent in the prior art.

SUMMARY OF THE INVENTION

The present invention solves the problems inherent in the prior art by providing a different vehicle odometer having an encoder in lieu of the standard EEPROM.

The encoder utilizes an encryption algorithm. The present invention will work with any encryption algorithm, the selection of which is left for the customer. According to one embodiment, when the encoder receives an increment signal, such as one generated when a vehicle travels a pre-determined distance, an odometer value is combined with another value to form a larger (longer) value that is harder to break. The larger bit value may then be encrypted by the encoder using the encryption algorithm and stored in the encoder's own EEPROM. A microcontroller is used to receive the encrypted value from the encoder and then to decrypt it in real time for transmission to a display device.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 2:
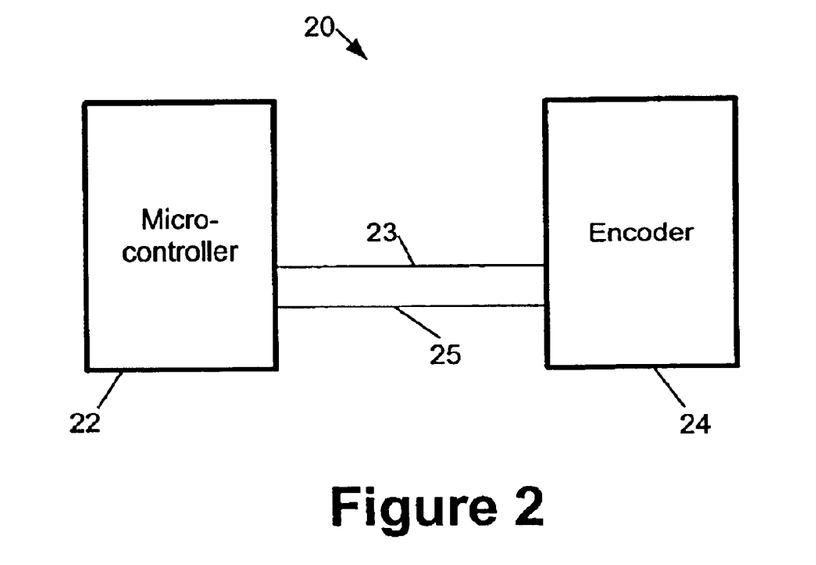
FIG. 2 is a block diagram of an electronic odometer of the present invention.

The basic configuration of the present invention is illustrated in FIG. 2. Quite simply, the electronic odometer 20 of the present invention is composed of a microcontroller 22 (having an integral decoder or an external decoder) and an encoder 24 that are connected for communication purposes by two signal lines 23 and 25. While this description uses, as an illustrative example, a mileage odometer, it will be clear to those skilled in the relevant art that the present invention can be used for many applications that require a secure (encrypted) counter without departing from the scope and spirit of the appended claims (e.g., gas meters, electric meters, etc.).

Figure 6:
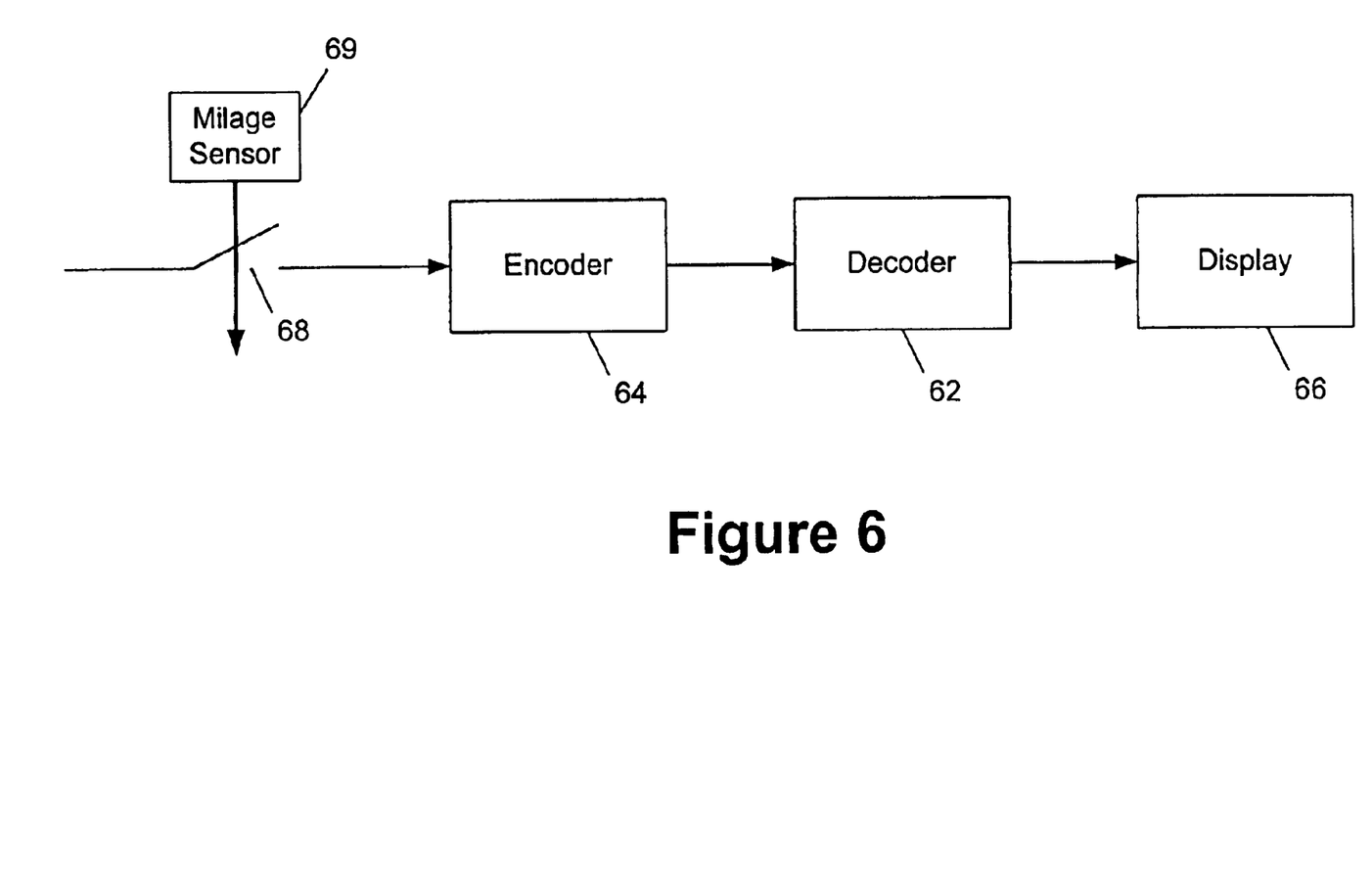
FIG. 6 is a block diagram illustrating a first alternate configuration of the present invention.
Figure 7A:
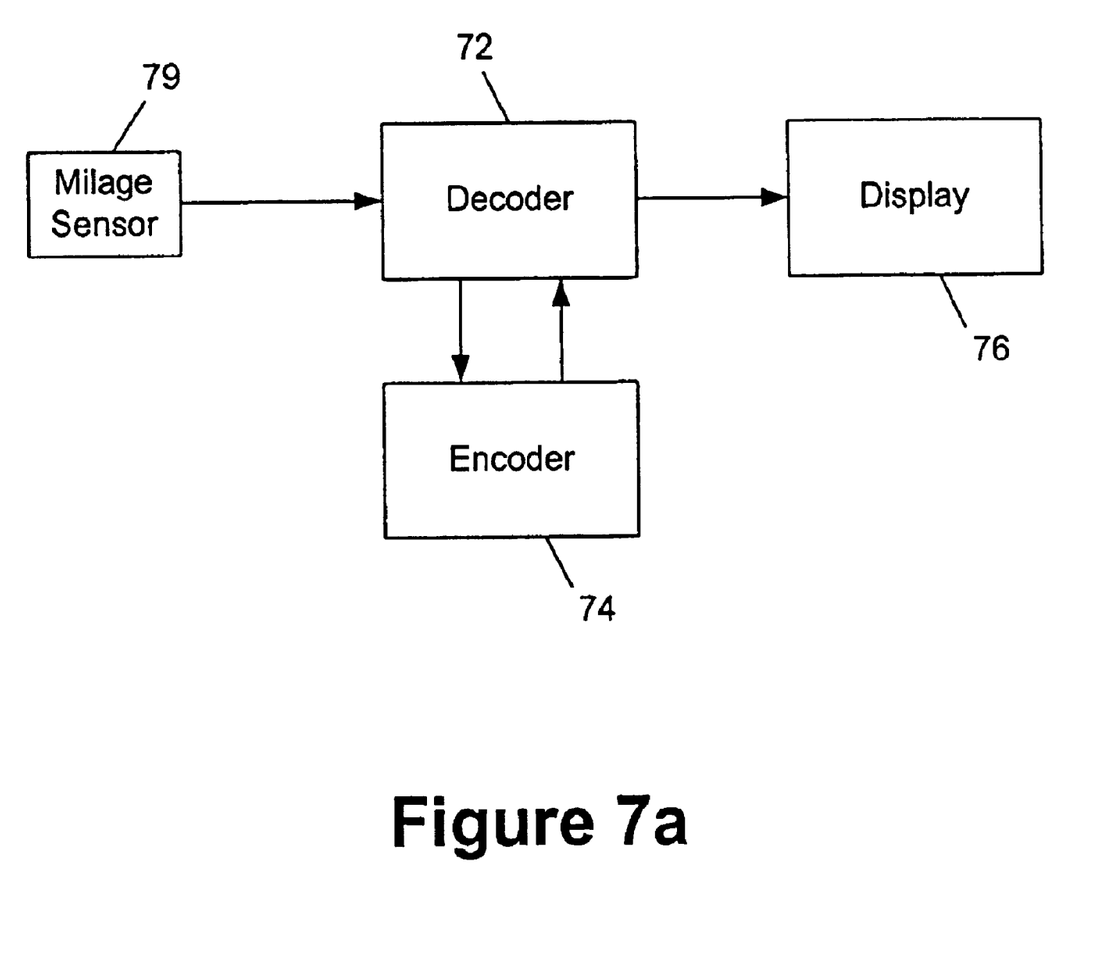
FIG. 7a is a block diagram illustrating a second alternate configuration of the present invention.
Figure 7B:
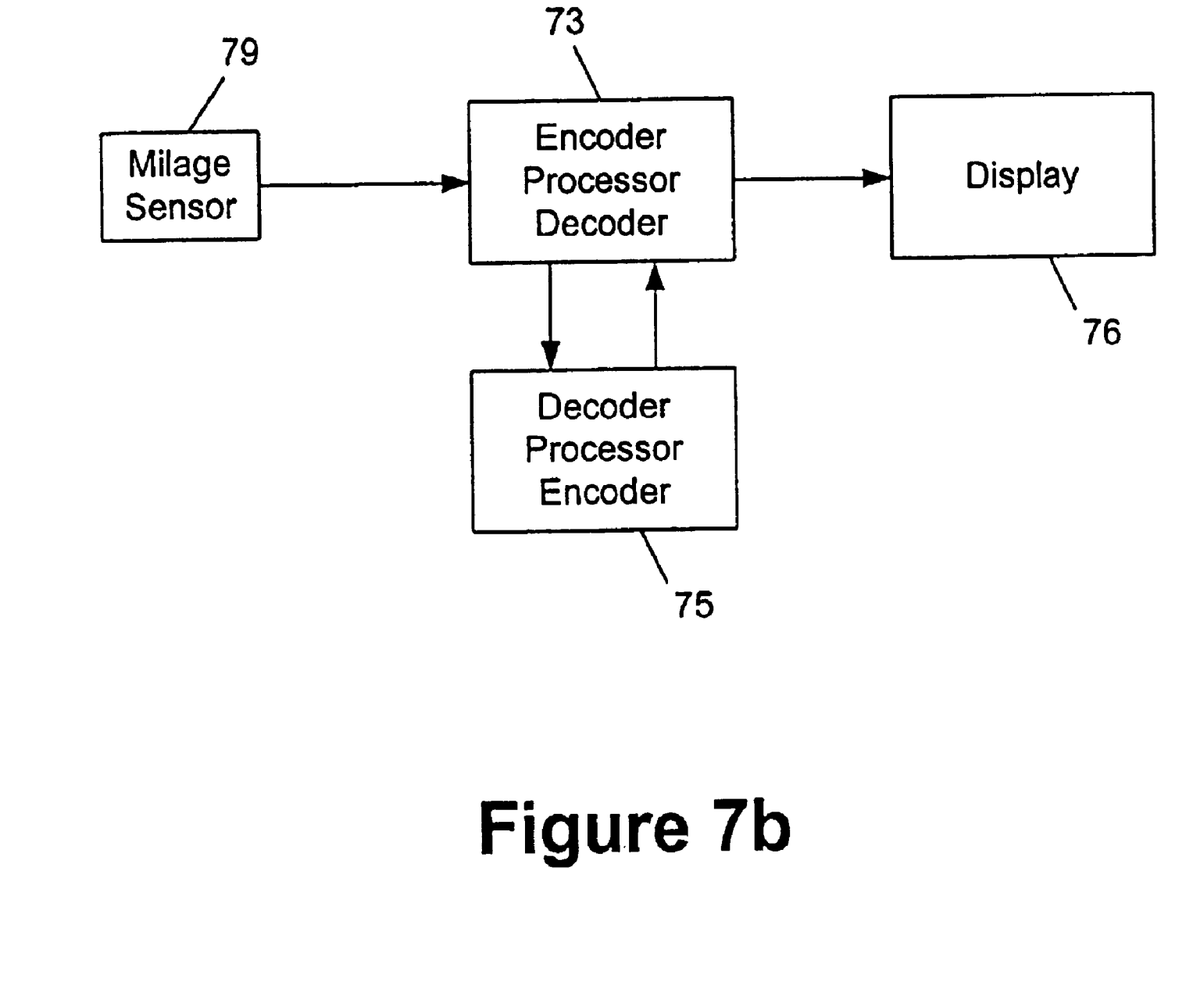
FIG. 7b is a block diagram illustrating a third alternate configuration of the present invention.

Alternate implementations of the encoder/decoder of the present invention are illustrated in FIGS. 6, 7a, and 7b. For example, FIG. 6 illustrates a serial configuration. According to FIG. 6, the encoder 64 receives an input signal from a voltage source that is responsive to a mileage sensor 69. The mileage sensor 69 effectively opens and closes the switch 68 which, when closed, stimulates the encoder 64 to increment the mileage-related value. In this configuration, the encoder 64 communicates with the decoder 62, which then decodes the encrypted signal to obtain the mileage value which the decoder 62 dutifully transmits to the display 66 as illustrated in FIG. 6. In an alternate embodiment of the present invention, the mileage sensor 69, the switch 68, and the encoder 64 can be integrated—making it more difficult to tamper with the odometer value stored within the encoder 64.

The mixed serial/parallel configuration illustrated in FIG. 7a differs significantly from the configuration illustrated in FIG. 6. The encoder/decoder combination of FIG. 7a most closely resembles the one found in FIG. 2. FIG. 7a shows a mileage sensor 79 that sends an update signal (either analog or digital) to the decoder 72. When the mileage sensor 79 generates a signal, the decoder 72, if equipped sufficiently with circuitry and/or logic, can decide whether or not to update the encoder 74. In an advantageous embodiment of the present invention, the internal configuration of the encoder is only 16 bits, which is insufficient resolution for typical automobile odometer applications. Hence, the advantageous embodiment uses an odometer-related value (known as the PEG value, which, for example, is updated every ten miles) in conjunction with a segment value that is incremented every mile (or other mileage sensor signal interval as the case may be). In this example, the following formula is used:

actual odometer value={current PEG value×10}+segment value

The configuration of FIG. 7a is well suited to the 16-bit limitation of the preferred embodiment of the encoder 74 because the decoder 72 has sufficient circuitry/logic to update the encoder once every ten miles (or other peg period) rather than updating every mileage event as with the configuration of FIG. 6. In this illustration, the encoder 74 is considered to be the master by the odometer system. The configuration of FIG. 7a also has an additional benefit over the simpler configuration of FIG. 6. The configurations of FIGS. 7a and 7b enables the decoder 72 and the encoder 74 to perform "mutual authentication" which is much more secure and much harder to temper because of the pure digital exchange of information that is preferred.

FIG. 7b is a modification of the configuration illustrated in FIG. 7a. Security is enhanced by enhancing the functionality of the encoder and decoder. As illustrated in FIG. 7b, encoder/processor/decoder (EPD) 73 is in functional communication with the corresponding decoder/processor/encoder (DPE) 75. Although the configuration of FIG. 7b functions in much the same manner as the configuration illustrated in FIG. 7a, the additional circuitry/logic of EPD 73 and DPE 75 enable a complete encryption authentication scheme between both elements in both directions of information flow rather than the single direction (i.e., only from output from encoder 74) of FIG. 7a.

As mentioned previously, the odometer counter of the present invention is composed of an encoder 24 and a microcontroller 22 as shown in FIG. 2. An example of a suitable encoder 24 for purposes of the present invention is the HCS201 manufactured by Microchip Technology Inc. of Chandler, Ariz. The microcontroller 22 can be any processor or microcontroller that has sufficient memory and computing capacity to perform the decryption and/or data processing tasks. It should be noted from the outset that the present invention is not limited to a specific encryption algorithm. Any encryption algorithm will work with the present invention, the selection of which is left to the user.

The encoder 24 may, according to the embodiment, be equipped with a unique key. While the key length is not terribly important to the function of the present invention, it is understood in the encryption art that the longer the key, the more secure the data protected by that key. In the preferred embodiment of the present invention, the key has at least 64 bits. Preferably, the key is used to configure an encryption engine. The encryption engine resides within the encoder 24 and can be composed of hardware or software or any combination therebetween. The encoder 24 of the present invention has sufficient computing capacity to execute the encryption scheme on the encryption engine using the odometer-related value to form an encrypted odometer-related value. According to one embodiment, the un-encrypted odometer-related value, once incremented, is then stored in a non-volatile memory in the encoder 24. It should be noted that in the preferred embodiment of the present invention, the encoder 24 is unable to transmit anon-encrypted odometer-related value externally. Thus, according to the preferred embodiment, a request for odometer call to the encoder 24 always returns an encrypted odometer value and thus dissuades tampering. Moreover, the encoder 24 is unable to accept a "write" function call that would overwrite the odometer-related data stored within a specific location of the non-volatile memory of the encoder 24. Finally, as a necessary function required of an odometer, the encoder 24 is able to increment the odometer value upon receiving an increment signal from, for example, the microcontroller 22. Once the odometer value is increased, it may be stored in the non-volatile memory of the encoder 24. While various non-volatile memories can be used with the present invention, the advantageous embodiment of the present invention has the encoder 24 equipped with an EEPROM specific for this application with a single bit write. This non-volatile internal configuration aids greatly in error recovery, particularly when the present invention is used in harsh environments or when there is an unreliable power supply or frequent shut-downs.

In addition to the encoder 24, the odometer counter 20 of the present invention includes a microcontroller 22. In the preferred embodiment of the present invention, the microcontroller 22 has sufficient computing capacity to decrypt the encrypted odometer-related value as received from the encoder 24 upon the proper read call being made to the encoder 24, at which point the microcontroller 22 then processes the data. Finally, the microcontroller 22 is also equipped to transmit the decrypted odometer value to another device, such as a display device (not shown).

It should be noted that the specific encryption algorithm used, be it implemented in hardware or software or some combination therebetween, is not directly important to the method of the present invention. It is envisioned that various users would chose different encryption algorithms, key lengths, and other implementation details to suit their particular needs.

In the preferred embodiment of the present invention, the odometer value is only 16 bits long because the encoder is configured internally as a 16-bit device, although other configured devices can be used without departing from the spirit and scope of the present invention. This may create a problem in that 16 bits is not sufficient to contain a foreseeable mileage number. This problem, however, can be remedied, for example, by incrementing the counter only every ten miles and keeping track of the remaining miles in the microcontroller memory. If the power to the system is lost or broken, the maximum degradation of accuracy would be only ten miles. This degradation problem could be remedied, for example, by using a larger bit length for the odometer value. A 32-bit length (or more) would be far more than sufficient. However, a 32-bit length for the odometer value would also add considerable cost and complexity to the encoder 24. An alternate (albeit more expensive) embodiment of the present invention utilizes 32-bit encoder and would thus use, store, and encrypt a 32-bit long odometer value without the need for an additional 16-bit value as described in the preferred embodiment. An 8-bit or less configured device could be used; however, an 8-bit device would have a very low mileage limit, but may be useful in some applications. In short, alternate applications of the present invention may require longer bit configurations, while still other alternate applications could make do with shorter bit configurations.

If the odometer value is only 16 bits in length, it may be necessary to add extra bits before the odometer value is encrypted. In the preferred embodiment of the present invention, a second 16 bit value is combined with a 16 bit odometer value to form a 32 bit concatenated value before the encryption process is executed. In the preferred embodiment of the present invention, the second 16 bit value is composed of a predetermined 12 bit value (that is retrieved from the encoder's nonvolatile memory) that is concatenated with a four bit value that is derived from inputs into the encoder 24. There are several advantages to this configuration. First, this configuration enables the second 16-bit value to be modified from counter system to counter system, thereby making each counter system 20 unique and thus harder to circumvent. Secondly, the first twelve bits of the sixteen bit "constant" can be a checksum (using, for example the CRC algorithm) combined with a scaling factor for the encoder counter.

The scaling factor is the factor that determines when the odometer mileage PEG (e.g., the 10-mile increments) is incremented. These twelve bits also allow for the use of an embedded checksum within the encrypted transmission for post-transmission analysis (to ensure that there was no tampering of the encrypted data during transmission), as well as an incrementing factor. The incrementing factor is used to obtain the actual odometer mileage peg from the odometer-related value using the following formula:

(Odometer-related value)*(Incrementing factor)=Odometer Mileage PEG

In the preferred embodiment of the present invention, the non-encrypted odometer value is stored within a non-volatile memory of the encoder 24 (see FIG. 2). Thereafter, and for as many times as the microcontroller 22 requests, a serial number (identifying the specific encoder 24) is attached to the data packet containing the encrypted odometer value and then transmitted to the microcontroller 22. In the preferred embodiment of the present invention, the transfer is asynchronous, although alternate transfer mechanisms are possible. The use of an identifier code, such as the serial number, precludes the substitution of the original encoder 24 with another encoder 24 (having a lower odometer value). An attacker can read the serial number but not the internal checksum data. Thus, the attacker cannot use the serial number to tamper with the odometer-related value without affecting the checksum.

Figure 3:
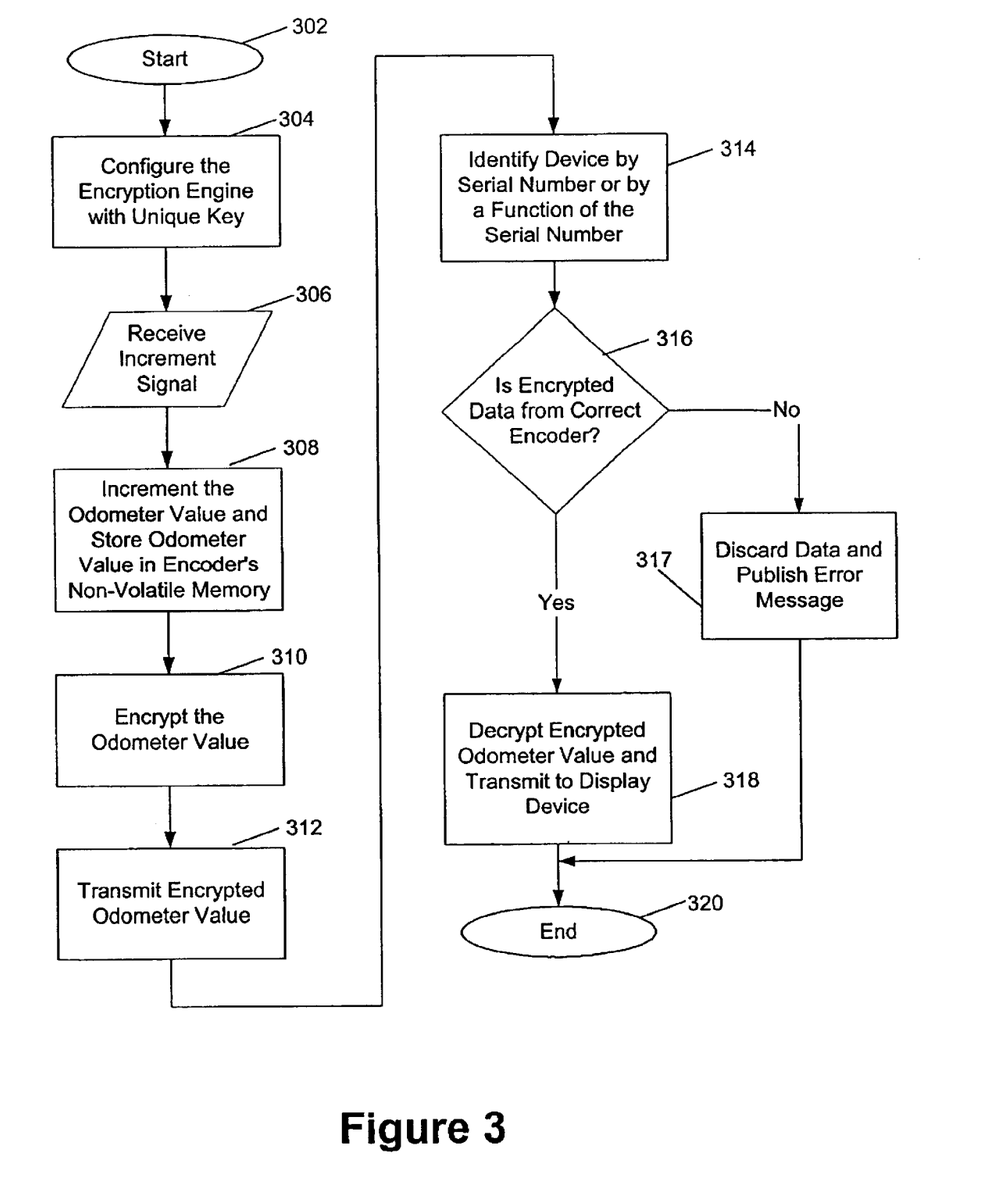
FIG. 3 is a flowchart showing the method of the present invention.

An overview of a method according to one embodiment of the present invention, is illustrated in FIG. 3. This method of the present invention presumes that there is an encoder having a unique key as well as encryption algorithm embodied either as hardware, software, or some combination therebetween. This sample method starts with step 302. Initially (i.e., upon encoder startup), the unique key is used to configure the encryption engine, step 304. Once initiated, the encoder is ready for operation. In typical operation, the encoder receives an increment signal, usually from the decoder, in step 306. Next, in step 308, the encoder increments the odometer value and then stores the incremented value back into the encoder's memory. After incrementing the odometer value, the encoder then encrypts the odometer value (or odometer-related value, as the case may be) in step 310. Normally, the decoder updates a display device on a periodic basis (normally once every few seconds). To this end, the encoder, in step 312, transmits the encrypted odometer value to the decoder, usually in an asymmetric fashion. Once the encrypted data is received by the decoder, the decoder first identifies the encoder from which it received the encrypted data to determine, through an identifying code with which each encoder is equipped, step 314. Next, in step 316, a check is made by the decoder to see whether or not the identifying code matches the one from the expected encoder. If not, the encoder is presumed to be a fake and execution skips to step 317 where an error message (indicative of tampering) is issued and the data discarded. Otherwise, the decoder decrypts the encrypted odometer value and sends the decrypted odometer value to the display device for display to the end user and the process ends in step 318. In either case, the process ends in step 320.

Figure 4:
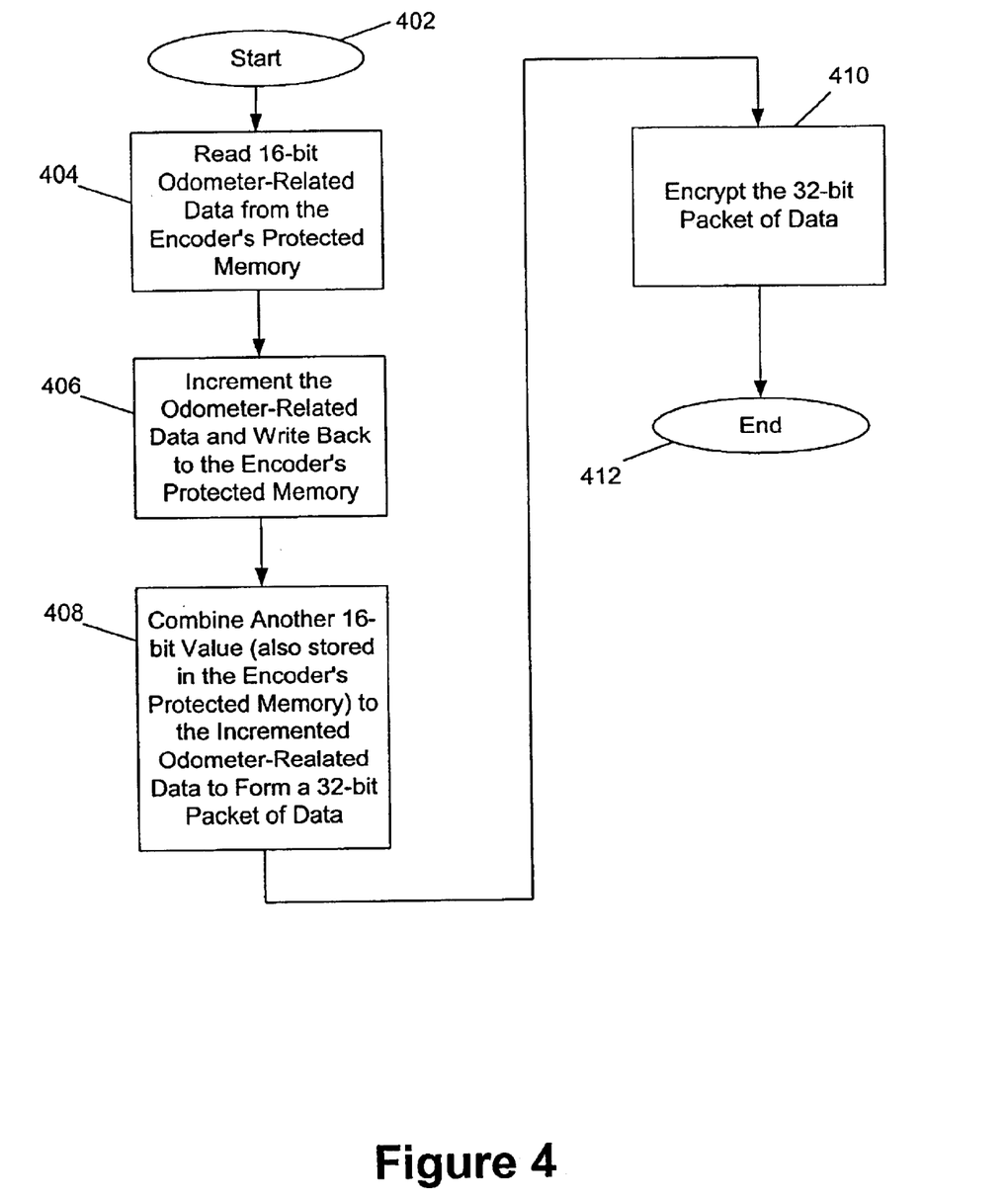
FIG. 4 is a flowchart of a sub-step of the method of the present invention.

Step 310 of a method according to one embodiment of the present invention, may be comprised of four sub-steps that are illustrated in FIG. 4. As mentioned previously, in the preferred embodiment, the odometer value is 16 bits in length. This 16-bit odometer-related value is first read from the encoder's protected memory in step 404. Next, in step 406, the odometer-related value is incremented and then the incremented odometer-related value is written back to the encoder's protected memory. In step 408, the incremented odometer-related value is then added to another, acaccording to this embodiment of the present invention, a 16-bit value to form a 32-bit packet of data. It should be noted that not all of the 16-bit value need be stored in the encoder's protected memory. Part of the 16-bit value can be stored elsewhere, such as in the decoder's non-volatile (protected) memory. Furthermore, part of the 16-bit value can be composed of a checksum of the odometer-related value combined with another value that is stored in the encoder's protected memory. Next, in step 410, the 32-bit value is encrypted to form a 32-bit packet of encrypted data and the sub step ends in step 410.

Figure 5:
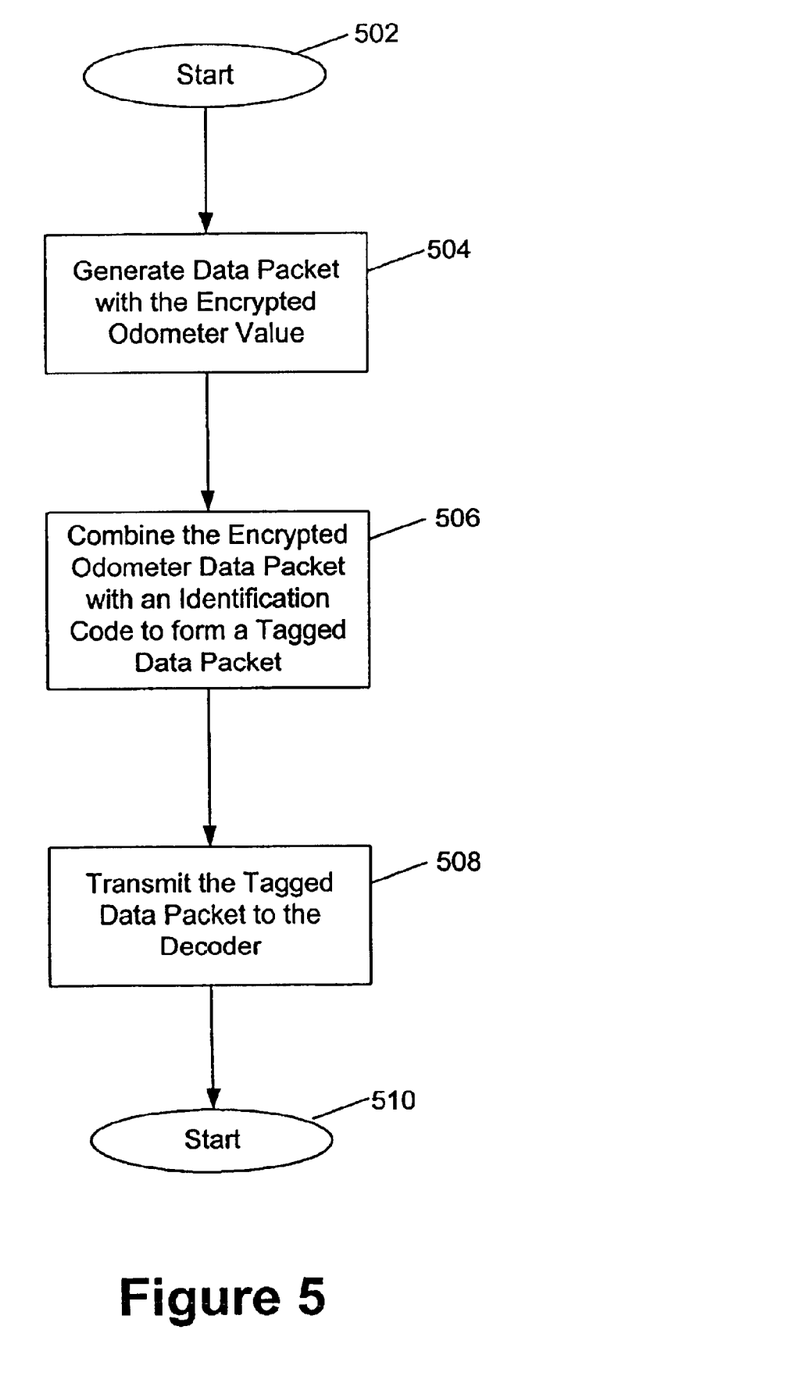
FIG. 5 is a flowchart of another sub-step of the method of the present invention.

Similarly, step 312 of FIG. 3 is, according to the preferred embodiment, itself composed of three sub steps that are illustrated in FIG. 5. The sub step begins in step 502. Thereafter, a 32-bit data packet containing the 16 bit constant and the 16-bit odometer-related value is encrypted to generate an encrypted odometer-related value in step 504. Next, in step 506, the encrypted 32-bit data packet is combined with an identification code to form a tagged data packet. Finally, the tagged data packet is then transmitted from the encoder to the decoder in step 508 and the process ends in step 510.

Figure 8:
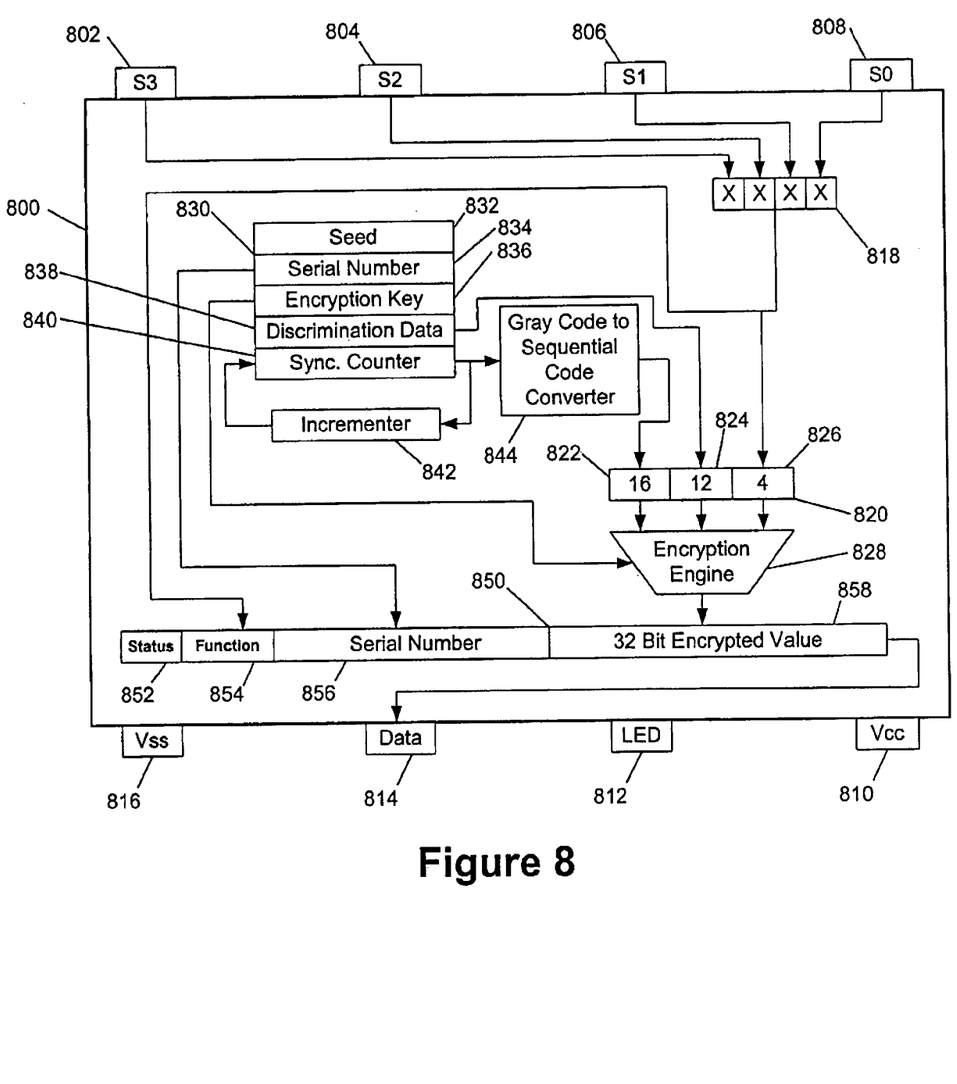
FIG. 8 is a block diagram illustrating the functional components of an encoder of the present invention.

FIG. 8 illustrates in block diagram form an embodiment of an encoder useful in the practice of the present invention. The encoder 800 has four input pins 802, 804, 806, and 808 entitled S3, S2, S1, and S0, respectively. In addition to the four input pins, the encoder 800 also has a $V_{ss}$ pin 816, an LED pin 812, and $V_{cc}$ pin 810. The output from the encoder 800 is through the data pin 814. The encoder 800 is equipped with program/data memory and/or registers that are interconnected by signal lines and/or a common or separate busses. The actual internal configuration for transmitting data from program/data memory or non-volatile memory to other registers or memory, or the choice of signal lines and/or busses, is not important to the present invention. Any internal communication mechanism that can retrieve data from one location within the encoder and deliver it to another area of the microcontroller will suffice.

The respective states of the four input pins 802, 804, 806, and 808 are placed into a buffer 818 as illustrated in FIG. 8. The value from the buffer 818 forms the 4-bit function component 854 of the full data packet 850. The value from the buffer 818 also forms a component of the 16-bit "constant" and is also stored in the 4-bit segment 826 of the pre-encryption buffer 820. The encoder 800 is equipped with a non-volatile (protected) memory 830. Within the non-volatile memory 830 are the seed variable 832, the identifying code variable 834, the encryption key 836, some discrimination data 838, and the counter 840 which contains the odometer-related value. The counter 840 can optionally be a synchronization counter. When the counter 840 needs to be incremented, the Gray coded counter 840 is read out of the memory 830 and is copied into the incrementer 842 where the Gray code is modified by one bit to an increase of one mileage segment. The incremented Gray code counter value 840 is then written back into the memory 830. The other copy of the Gray coded counter 840 is sent to the Gray code-to-Sequential code converter 844 which converts the Gray coded counter value 840 into normal sequential code (i.e., standard binary digits) and then writes that sequential odometer-related value into a 16-bit segment 822 of the preencryption buffer 820. The third component of the pre-encryption data is the discrimination data 838 constant that is copied from the non-volatile memory 830 to the discrimination data segment 824 of the pre-encryption buffer 820. In alternate embodiments of the present invention, however, part of the constant data can be obtained from the memory location 838 and the remainder from some other place or, preferably, calculated in real-time, such as a CRC value based upon the current odometer-related value stored in the 16-bit segment 822. As mentioned before, the encryption key 836 can be stored into the memory 830 before first operation of the encoder 800, or, it can be generated using the seed 832 singly or in conjunction with the discrimination data 838.

After all of the data segments 822, 824, and 826 have been loaded into the buffer 820, the encryption key 836 is loaded into the encryption engine 828 as illustrated in FIG. 8. Within the encryption engine 828, the 32 bits of clear text data are transformed into 32 bits of encrypted data which is then stored in the 32-bit encrypted data segment 858 of the full data packet 850. Either before, during, or after the 32-bet encrypted value is loaded into the buffer segment 858 (the order does not matter), the other segments of the full data packet 850 are appended (loaded) into their various segments 852, 854, and 856. Status bits, (e.g., a low voltage bit and a repeat bit) which can indicate the functional condition of the encoder 800, are optionally stored into the status segment 852 of the full data packet 850. As mentioned before, the contents of the buffer 818 containing the state of the four input bits may, optionally, be loaded into the 4-bit segment 854. It is important to note that adding the four input bits may pose a security hazard, as it would give an opportunity for an attacker to manipulate the four input signals (and thus the ultimate output data signal) in order to modify the odometer value. Thus, the overall system would be more secure if the four input values were not added to the full data packet, however remote the possibility of manipulation.

In addition to the other values, the identification code 834 is read out of the non-volatile memory 830 and copied into the serial segment 856 of the full data packet 850. The complete 66-bit full data packet is then transmitted out through the data pin 814 to the decoder.

Figure 9:
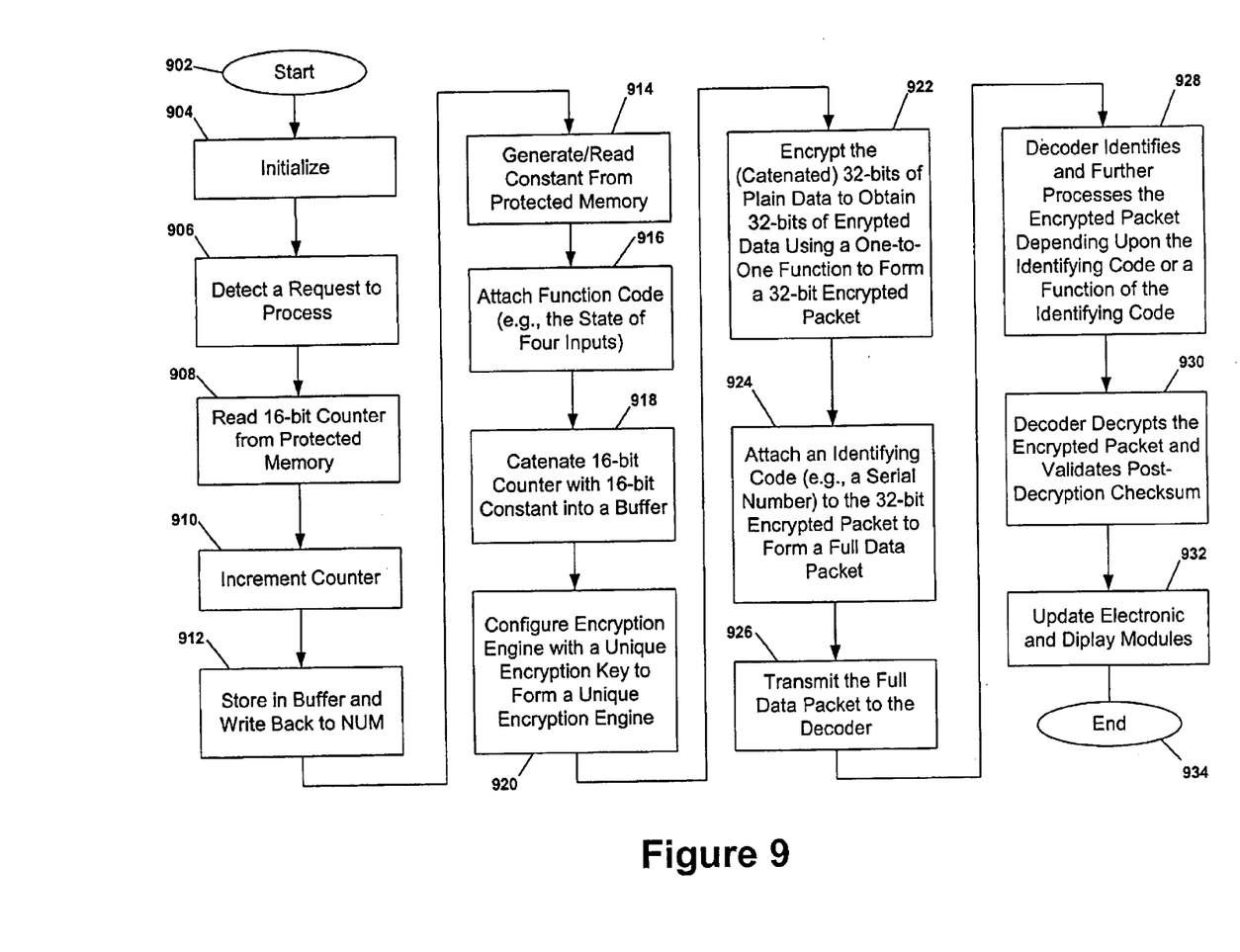
FIG. 9 is a flowchart further illustrating the method illustrated in FIG. 4.

FIG. 9 illustrates a detailed description of the method of the present invention. The method of FIG. 9 starts at step 902. The process is initialized (started) in step 904. Thereafter, a request to process is detected by the encoder in step 906. Next, in step 908, the counter value is read from the non-volatile protected memory. Normally, the counter value (i.e., the odometer-related value) is in the form of Gray code. A binary Gray code with n digits corresponds to a Hamiltonian path on an n-D hypercube (including direction reversals). For the present invention, a binary Gray code is a number encoding scheme such that adjacent numbers have a single bit difference. Use of the Gray code with the present invention simplifies the processing and the implementation scheme.

In step 912, the incremented counter (the incremented odometer-related value) is first stored in a buffer and a copy is written back to the encoder's non-volatile protected memory. Next, in step 914, a 12-bit constant or portion thereof is read from the encoder's protected memory. A 4-bit function code that is comprised of the status of each of the four input pins is then attached to the 12-bit value to form a 16-bit value in step 916. Next, the 16-bit value is catenated with the 16-bit odometer-related value to form a 32-bit value that is stored into a buffer. Thereafter, according to one embodiment of the present invention, the encryption engine is configured with a unique encryption key, thereby forming a unique encryption engine, step 920. The 32-bits of plain data are then encrypted to obtain 32-bits of encrypted data forming a 32-bit data packet, step 922. Typically, this encryption process uses a one-to-one fimction (to maintain the same number of bits) although other functions can be used without departing from the scope of the present invention. Next, a 28 bit identifying code, such as a serial number, is attached to the 32-bit. Optionally, a status code, and/or the function code mentioned previously can be attached to the identification code to form a full data packet, step 924. In step 926, the full data packet is transmitted to the decoder.

According to one embodiment, upon receipt of the full data packet from the encoder, the decoder identifies the source of the full data packet using either the identifying code or a function of the identifying code in step 928, and, if found to originate from the correct encoder, decrypts the encrypted data packet and validates the odometer-related value with the decryption checksum in step 930. Finally, the PEG value, which is first multiplied by the scaling factor, is then added to the segment value in order to obtain the actual odometer value, which is then used to update any electronic and/or display modules in step 932. The process then ends at step 934.

The present invention, therefore, is well adapted to carry out the objects and attain both the ends and the advantages mentioned, as well as other benefits inherent therein. While the present invention has been depicted, described, and is defined by reference to particular advantageous embodiments of the invention, such references do not imply a limitation on the invention, and no such limitation is to be inferred. The invention is capable of considerable modification, alternation, alteration, and equivalents in form and/or function, as will occur to those of ordinary skill in the pertinent arts. The depicted and described advantageous embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An odometer counter, said odometer counter comprising:

an encoder, said encoder having a unique key, said key constructed and arranged to configure an encryption engine, said encoder further constructed and arranged to execute said encryption engine with an odometer value to form an encrypted odometer value, said encoder further constructed and arranged to store said odometer value in a non-volatile memory, said encoder is further constructed and arranged to increment said odometer value upon receiving an increment signal; and a decoder, said decoder constructed and arranged to receive said encrypted odometer value from said encoder, said decoder further constructed and arranged to decrypt said encrypted odometer value and to transmit said decrypted odometer value.

2. An odometer counter, said odometer counter comprising:

an encoder, said encoder having a unique key, said key constructed and arranged to configure an encryption engine, said encoder further constructed and arranged to execute said encryption engine with an odometer value to form an encrypted odometer value, said encoder further constructed and arranged to store said odometer value in a non-volatile memory; and a decoder, said decoder constructed and arranged to receive said encrypted odometer value from said encoder, said decoder further constructed and arranged to decrypt said encrypted odometer value and to transmit said decrypted odometer value;

wherein said key is 64 bits in length.

3. An odometer counter, said odometer counter comprising:

an encoder, said encoder having a unique key, said key constructed and arranged to configure an encryption engine, said encoder further constructed and arranged to execute said encryption engine with an odometer value to form an encrypted odometer value, said encoder further constructed and arranged to store said odometer value in a non-volatile memory; and a decoder, said decoder constructed and arranged to receive said encrypted odometer value from said encoder, said decoder further constructed and arranged to decrypt said encrypted odometer value and to transmit said decrypted odometer value;

wherein said odometer value is 16 bits in length.

4. An odometer counter as in claim 3 wherein said 16 bit odometer value is combined with another 16 bit value.

5. An odometer counter as in claim 4 wherein said another 16 bit value is composed of a pre-defined 12 bit value and a 4 bit value based upon inputs to said encoder.

6. An odometer counter as in claim 5 wherein said 12 bit value is stored in said non-volatile memory of said encoder.

7. An odometer counter, said odometer counter comprising:

an encoder, said encoder having a unique key, said key constructed and arranged to configure an encryption engine, said encoder further constructed and arranged to execute said encryption engine with an odometer value to form an encrypted odometer value, said encoder further constructed and arranged to store said odometer value in a non-volatile memory; and a decoder, said decoder constructed and arranged to receive said encrypted odometer value from said encoder, said decoder further constructed and arranged to decrypt said encrypted odometer value and to transmit said decrypted odometer value;

wherein said encrypted odometer value from said encoder is transmitted asynchronously to said decoder.

8. A method for securing odometer values, said method comprising the steps of:

(a) providing an encoder having a unique key and an encryption engine;

(b) configuring said encryption circuit with said key;

(c) receiving an increment signal;

(d) incrementing an odometer value to form an incremented odometer value;

(e) storing said incremented odometer value into said a non-volatile memory;

(f) adding a 16-bit value to said odometer value to form a 32 bit value;

(g) encrypting said 32 bit value with said encryption engine to form said encrypted odometer value;

(h) transmitting said encrypted odometer value to a decoder; and (i) decrypting said encrypted odometer value with said decoder to obtain said odometer value.

9. A method for securing odometer values, said method comprising the steps of:

(a) providing an encoder having a unique key and an encryption engine;

(b) configuring said encryption circuit with said key;

(c) receiving an increment signal;

(d) incrementing an odometer value to form an incremented odometer value;

(e) storing said incremented odometer value into said a non-volatile memory;

(f) encrypting said incremented odometer value with said encryption engine to form an encrypted odometer value;

(g) generating a data packet with said encrypted odometer value;

(h) adding an identifier code to said data packet to form a tagged data packet;

(i) transmitting said tagged data packet from said encoder to said decoder; and (j) decrypting said encrypted odometer value with said decoder to obtain said odometer value.

10. An odometer counter as in claim 5 wherein a portion of said 12 bit value is stored in said non-volatile memory of said encoder.

11. An odometer counter as in claim 5 wherein a portion of said 12 bit value is a checksum based on said odometer value.

\* \* \* \* \*